(12) United States Patent
van de Grampel et al.

(10) Patent No.: US 7,355,944 B2
(45) Date of Patent: Apr. 8, 2008

(54) AUTHENTICATABLE MEDIA AND METHOD OF AUTHENTICATING

(75) Inventors: Hendrik T. van de Grampel, Mijnsheerenland (NL); Sriramakrishna Maruvada, Evansville, IN (US); Vandita Pai-Paranjape, Evansville, IN (US); Radislav A. Potyrailo, Niskayuna, NY (US); Philippe Schottland, Evansville, IN (US); Marc B. Wisnudel, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 561 days.

(21) Appl. No.: 10/987,282

(22) Filed: Nov. 12, 2004

(65) Prior Publication Data

US 2006/0104172 A1    May 18, 2006

(51) Int. Cl.
  *G11B 7/00* (2006.01)
(52) U.S. Cl. .................... 369/53.1; 369/53.21
(58) Field of Classification Search ............ 369/53.22, 369/53.1, 53.25, 59.75, 53.21, 44.37, 59.25
  See application file for complete search history.

(56) References Cited

U.S. PATENT DOCUMENTS

| | | | |
|---|---|---|---|
| 4,514,085 A | 4/1985 | Kaye | |
| 4,699,510 A | 10/1987 | Alguard | 356/73 |
| 5,005,873 A | 4/1991 | West | 283/92 |
| 5,137,364 A | 8/1992 | McCarthy | 356/402 |
| 5,326,692 A | 7/1994 | Brinkley et al. | 435/6 |
| 5,329,127 A | 7/1994 | Becker et al. | 250/459.1 |
| 5,510,619 A | 4/1996 | Zachmann et al. | 250/339.08 |
| 5,553,714 A | 9/1996 | Cushman et al. | 209/577 |
| 5,568,251 A | 10/1996 | Davies et al. | |
| 5,838,451 A | 11/1998 | McCarthy | 356/406 |
| 6,099,930 A | 8/2000 | Cyr et al. | |
| 6,160,787 A | 12/2000 | Marquardt, Jr. et al. | 369/275.1 |
| 6,290,130 B1 | 9/2001 | Drexler | |
| 6,380,547 B1 | 4/2002 | Gonzalez et al. | 250/458.1 |
| 6,589,626 B2 | 7/2003 | Selinfreund et al. | 428/64.1 |
| 6,638,593 B2 | 10/2003 | Selinfreund et al. | 428/64.1 |
| 6,707,539 B2 | 3/2004 | Selinfreund et al. | 356/71 |
| 2003/0012562 A1 | 1/2003 | Lawandy et al. | 386/126 |
| 2003/0080193 A1 | 5/2003 | Ryan et al. | |

FOREIGN PATENT DOCUMENTS

EP    0 121 261 A2    10/1984

(Continued)

OTHER PUBLICATIONS

U.S. Appl. No. 10/723,682, filed Nov. 24, 2003, Marc Wisnudel et al., "Authenticable Optical Disc, System for Authenticating and Optical Disc and Method Thereof", 20 pages.

(Continued)

*Primary Examiner*—Nabil Hindi

(57) ABSTRACT

One method for playing a disk, comprises illuminating a first portion of the optical article with a first laser to obtain a first optical signal, wherein the first laser has a first wavelength, illuminating a second portion with a second laser to obtain a second optical signal, wherein the second laser has a second wavelength that is different from the first wavelength, and determining if the optical article is authentic by comparing the first optical signal and the second optical signal.

30 Claims, 5 Drawing Sheets

FOREIGN PATENT DOCUMENTS

| | | | |
|---|---|---|---|
| EP | 0 181 228 B1 | 1/1993 | |
| EP | 0935242 A1 | 11/1999 | |
| EP | 1 220 165 A2 | 7/2002 | |
| GB | 1170965 | 11/1969 | |
| GB | 2 264 558 A | 9/1993 | |
| JP | 11-25507 * | 1/1999 | ............. 369/53.25 |
| JP | 11-154353 * | 6/1999 | ............. 369/53.23 |
| WO | WO 98/31011 A2 | 7/1998 | |
| WO | WO 00/14736 A1 | 3/2000 | |
| WO | WO0250744 A2 | 6/2002 | |
| WO | WO 03/087888 A2 | 10/2003 | |
| WO | WO 03/105075 | 12/2003 | |
| WO | WO2004026589 A1 | 4/2004 | |

OTHER PUBLICATIONS

JP11154353A2: Optical Recording Medium, Its Reproducing and Authenticity Decision Device for Optical Recording; Jun. 8, 1999, Abstract only, 2 pages.

International Search Report; Interntional Application No.: PCT/US2005/040132, Applicant's File Reference 08CL147105, International Filing Date Nov. 4, 2005, Date of Mailing Mar. 16, 2006, 6 pages.

* cited by examiner

AUTHENTICATABLE MEDIA AND METHOD OF AUTHENTICATING

BACKGROUND OF THE INVENTION

A major problem confronting the various makers and users of non-recordable and recordable data storage media such as compact disks (CD), digital versatile disks (DVD), super audio CDs (SACD), enhanced video disks (EVD), recordable compact disks (CD-R) and recordable digital versatile disks (DVD-R) is the unauthorized reproduction or copying of information by unauthorized manufacturers, sellers, and/or users. Such unauthorized reproduction or duplication of data storage media is often referred to as piracy. Piracy may occur in a variety of ways, including consumer level piracy at the point of end use as well as wholesale duplication of data, substrate and anti-piracy information at the commercial level. Regardless of the manner, piracy of data storage media deprives legitimate digital content providers and manufacturers of significant revenue and profit.

Attempts to stop piracy at the consumer level have included the placement of electronic anti-piracy signals on information carrying substrates along with the information sought to be protected. The machine readers and players of such data storage media are configured to require the identification of such anti-piracy signals prior to allowing access to the desired information. Theoretically, consumer level duplications are unable to reproduce these electronic anti-piracy signals on unauthorized copies and hence result in duplicates and copies that are unusable.

However, numerous technologies to thwart such consumer level anti-piracy technologies have been and continue to be developed. Moreover, commercial level duplications have evolved to the point that unauthorized duplicates may now contain the original electronic anti-piracy circuit, code, etc. For example, commercial level duplication methods include pit copying, radio frequency (RF) copying, "bit to bit" copying and other mirror image copying techniques which result in the placement of the anti-piracy signal on the information carrying substrate of the duplicate along with the information sought to be protected. Other technologies commonly used by hackers include the modification of the computer code in order to remove anti-piracy (also referred to as copy-protection or copy-proofing) features and enable unlimited access to the data.

It would be desirable to have a data storage media that can be easily identified as authentic or pirated. One anti-piracy technology aimed at combating these more sophisticated consumer and commercial level reproduction and copying practices involves the placement of 'tags' or authentication markers in substrates used in the construction of data storage media. Such tags or authentication markers can be detected at one or more points along the data storage media manufacturing or distribution chain or by the end use reader or player used to access the data on a particular data storage media.

The automated identification of plastic compositions used in data storage media is very desirable for a variety of applications, such as recycling, tracking the manufacturing source, antipiracy protection, and others. Furthermore, it may be desirable for automated authentication of the data storage media. Despite the foregoing, there still remains a need for methods of tagging and authenticating storage media.

SUMMARY

This disclosure relates to authenticatable disks, methods for playing disks, and methods for authenticating disks. In one embodiment, the method for playing a disk can comprise illuminating a disk with a first laser having a first wavelength and determining if a first static response is within a predetermined response range. If the first static response is within the predetermined response range, the disk is illuminated with a second laser having a second wavelength that is different from the first wavelength.

One method for playing a disk can comprise illuminating a first portion of the optical article with a first laser to obtain a first optical signal, wherein the first laser has a first wavelength, illuminating a second portion with a second laser to obtain a second optical signal, wherein the second laser has a second wavelength that is different from the first wavelength, and determining if the optical article is authentic by comparing the first optical signal and the second optical signal.

In one embodiment, an optical article drive system encoded with a machine readable computer program code, said code including instructions for causing a computer to implement a method for using a optical article, can comprise: illuminating the optical article with a first laser to obtain a first optical signal, wherein the first laser has a first wavelength; illuminating the optical article with a second laser to obtain a second optical signal, wherein the second laser has a second wavelength that is different from the first wavelength; and determining if the optical article is authentic by comparing the first optical signal and the second optical signal.

In one embodiment, an optical article can comprise: first data readable at a first wavelength, second data readable at a second wavelength, wherein the first wavelength and the second wavelength are different, and an optical modifier disposed in an optical modifier portion of the optical article in optical communication with the first data. The optical modifier can change an optical property of the optical article by a sufficient amount such that a difference between a first optical signal from the first portion and a second optical signal from the second portion of the first data is greater than or equal to 15%. The first data can comprise DVD formatted data and the second data can be CD formatted data, HD-DVD formatted data, and/or Blu-ray formatted data.

In another embodiment, an optical article can comprise: first data readable at a first wavelength, second data readable at a second wavelength, wherein the first wavelength and the second wavelength are different, and an optical modifier disposed in an optical modifier portion of the optical article in optical communication with the first data. The optical modifier can change an optical property of the optical article by a sufficient amount such that a difference between a first optical signal from the first portion and a second optical signal from the second portion of the first data is greater than or equal to 15%. The optical article can be an ID card, passport, payment card, license, permit, personal information card, and/or security document.

In yet another embodiment, an optical article can comprise: first data readable at a first wavelength; second data readable at a second wavelength, wherein the first wavelength and the second wavelength are different and wherein the first wavelength is higher than the second wavelength, and an optical modifier disposed in an optical modifier portion of the optical article in optical communication with the first data. The optical modifier changes an optical property of the optical article by a sufficient amount such that a first optical signal from a first portion is greater than or equal to 15% lower than a second optical signal from a second portion.

In another embodiment, a method for using an optical article can comprise: illuminating a first portion of the optical article with a first laser to obtain a first optical signal, illuminating the first portion with a second laser to obtain a second optical signal, and determining if the optical article is authentic by comparing a first optical signal and a second optical signal to a reference representative of an optical article comprising an optical modifier. The first laser can have a first wavelength. The second laser can have a second wavelength that is different from the first wavelength. The difference between the first optical signal and the second optical signal can be greater than or equal to 25%.

The above described and other features are exemplified by the following figures and detailed description.

BRIEF DESCRIPTION OF THE DRAWINGS

Refer now to the figures, which are exemplary embodiments, and wherein the like elements are numbered alike.

DETAILED DESCRIPTION

Figure 1:
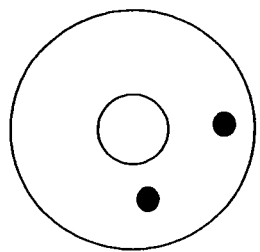
FIG. 1 is a schematic illustration of an optical disk with discrete reagent spots.

It is noted that the terms "first," "second," and the like, herein do not denote any amount, order, or importance, but rather are used to distinguish one element from another, and the terms "a" and "an" herein do not denote a limitation of quantity, but rather denote the presence of at least one of the referenced item. Additionally, all ranges disclosed herein are inclusive and combinable (e.g., the ranges of "up to 25 wt %, with 5 wt % to 20 wt % desired," are inclusive of the endpoints and all intermediate values of the ranges of "5 wt % to 25 wt %," etc.). As used herein the term "about", when used in conjunction with a number in a numerical range, is defined being as within one standard deviation of the number "about" modifies.

Examples of possible media that can employ the following authentication include, for example, optical and magneto-optical media formats, such as compact disks (CD) (e.g., recordable compact disk (CD-R), rewritable compact disk (CD-RW), and the like), magneto-optical disks, digital versatile disks (e.g., DVD-5, DVD-9, DVD-10, DVD-18, DVD-R, DVD-RW, DVD+RW, DVD-RAM, HD-DVD, and the like), Blu-Ray disks, enhanced video disks (EVD), and recordable and re-writable Blu-Ray disks, and the like. Capitalizing on drive differences in the drive logic and/or drive commands used to play media enables the creation of optical disks protected against illegal copying (copy-resistant disks). The copy-resistant disks comprise a test portion that has a different read-back capability at two laser wavelengths. In one embodiment, the test portion (comprising all or a portion of the disk) will be readable at a first laser wavelength, while not readable at a second wavelength, wherein one of the laser wavelengths is greater than the other laser wavelength such that there is an identifiable read-back difference at the laser wavelengths (e.g., comparing the waveforms). If the first optical signal, which can be a static response (i.e., a response that does not change over time), is different from a normal signal (e.g., an expected response from that type of disk), and the difference is sufficient to enable the first optical signal to be distinguishable from the normal signal (i.e., the drive optics are capable of sensing the signals and distinguishing them from regular noise, standard manufacturing variations, and the like), the disk can be illuminated with a second laser having a second wavelength that is different from the first wavelength. In one embodiment, the first optical signal can be read at a different gain setting than the second optical signal. Optionally, the first optical signal (e.g., waveform, or the like) can be outside the normal specifications for the specific optical media format portion, and/or the first optical signal can be perceived as a disk error by the drive.

Optionally, the test portion can have a reduced readability at a first laser wavelength, while being readable at a second wavelength, wherein one of the laser wavelengths is greater than the other laser wavelength such that there is an identifiable read-back difference at the different laser wavelengths. For example, a disk can be readable at both 780 nm and 650 nm. A portion of the disk in the 780 nm readable section can have an optical modifier (e.g., absorber, or the like) such that the readability in the optical modifier portion (e.g., test portion) is measurably changed (e.g., decreased, increased, or otherwise changed) from the remainder of the 780 nm readable section. This optical modifier can be a static modifier (i.e., the modifier can not alternate between an absorbing and non-absorbing state; e.g., an absorbing state can not be changed back to a non-absorbing state other than by a process involving an irreversible degradation of the absorbing state.) That test portion, however, can be read, for example, at 650 nm. This test portion can comprise information and/or instructions. For instance, the portion can comprise codes, serial numbers, identifiers, source information, etc., e.g., that proves the authenticity of the disk. Optionally, the test portion can be readable at two (or more) laser wavelengths at a different disk spin rate other than the standard disk spin rate. Optionally, the test portion can be read at two or more disk spin rates so that the optical signal is dependent upon the change in spin rate.

The test portion can be formed in different fashions, including the use of two or more types of data (e.g., mastered with a different pit size, mastered with a different format (e.g., DVD and CD), and/or the like), and/or a layer that modifies the test portion (e.g., changes the optical properties) at predetermined laser wavelength(s). Where different test portions are employed, the test portions may be located on a single substrate (i.e., in the same layer) or on different substrates (i.e., in different layers). For example, where the disk comprises two substrates (e.g., a DVD type disk arrangement), each substrate can have a different type of test portion; e.g., the first data substrate can be a DVD format and the second data substrate can be a CD format, thus forming a "hybrid" disk.

Optionally, the data types can comprise an identifier (e.g., a code, message, instructions, information, or the like) that enables the authentication of the disk. For example, the identifier can contain information relative to the disk, product, and/or lot (such as product details, lot number, serial number, fabrication date, fabrication line, manufacturer, distributor), and the like.

Alternatively, or in addition, the disk can include a layer that modifies the ability to read the data of the test portion at certain wavelengths (a modifying layer). For example, the layer can comprise an optical modifier, such as a laser absorber (e.g., a near infrared absorber if the data portion is theoretically designed to be readback with a 780 nanometer (nm) laser), a luminescence material, a refractive index changer, a scattering agent, a polarization modifier, a non-linear optical material (i.e., material that exhibits a laser absorption/transmission that is not linearly correlated with power of the laser beam), and the like, as well as combinations comprising at least one of the foregoing optical modifier. Depending upon the system (e.g., the two wavelengths of interest), the optical modifier can be chosen to affect (e.g., partially or fully prevent, enhance, or otherwise change the read capability) the energy at one of the wavelengths while enabling (e.g., not affecting) readback at the other wavelength. For example, a laser absorber can be selected to affect readback capability at a first wavelength (e.g., 780 nm), while allowing readback at a second wavelength (e.g., 650 nm, 405 nm, or the like). In another exemplary embodiment, the disks can have a portion readable in a standard DVD format (e.g., using a wavelength of about 650 nm), and not readable at a wavelength of about 780 nm or about 405 nm, with another portion readable in a HD-DVD format (e.g., using a wavelength of about 405 nm) and not readable at a wavelength of about 780 nm or about 650 nm. (It is noted that the wavelengths, e.g., 405 nm, 650 nm, and 780 nm, for example, are actually a range of wavelengths of about ±25 nm around those wavelengths (e.g., about 380 nm-about 430 nm).)

The modifying layer can be any layer of the article that can affect the readability of another layer. For example, the modifying layer can be the substrate (if multiple substrates are present, one of the substrates), a coating, an adhesive between layers or substrates, a metal layer between or on a side of substrates/layers (e.g., with special reflective properties (i.e., wavelength dependent reflective properties)), and/or the like. Optionally, the modifying layer (or an additional modifying layer) can be employed to control the use of the disk, e.g., render it only readable in a specific player or type of players (e.g., a Microsoft Xbox console).

The disk with the test portion and/or modifying layer comprises a substrate polymer. Depending upon the type of disk, the substrate polymer can have suitable optical characteristics to be used for optical disks. Examples of substrate polymers include, amorphous, crystalline, and/or semi-crystalline thermoplastic materials, such as: polyvinyl chloride, polyolefins (including linear and cyclic polyolefins and including polyethylene, chlorinated polyethylene, polypropylene, and the like), polyesters (including polyethylene terephthalate, polybutylene terephthalate, polycyclohexylm-ethylene terephthalate, and the like), polyamides, polysulfones (including hydrogenated polysulfones, and the like), polyimides, polyether imides, polyether sulfones, polyphenylene sulfides, polyether ketones, polyether ether ketones, ABS resins, polystyrenes (including hydrogenated polystyrenes, syndiotactic and atactic polystyrenes, polycyclohexyl ethylene, styrene-co-acrylonitrile, styrene-co-maleic anhydride, and the like), polybutadiene, polyacrylates (including polymethylmethacrylate, methyl methacrylate-polyimide copolymers, and the like), polyacrylonitrile, polyacetals, polycarbonates, polyphenylene ethers (including those derived from 2,6-dimethylphenol and copolymers with 2,3, 6-trimethylphenol, and the like), ethylene-vinyl acetate copolymers, polyvinyl acetate, liquid crystal polymers, ethylene-tetrafluoroethylene copolymer, aromatic polyesters, polyvinyl fluoride, polyvinylidene fluoride, polyvinylidene chloride, polytetrafluorethylene, as well as thermosetting resins such as epoxy, phenolic, alkyds, polyester, polyimide, polyurethane, mineral filled silicone, bis-maleimides, cyanate esters, vinyl, and benzocyclobutene resins, in addition to combinations, blends, copolymers, mixtures, reaction products, and composites comprising at least one of the foregoing. Non-limiting examples of such polymers include polycarbonate, polycarbonate-siloxane copolymers, transparent cyclic polyolefins, polyacrylates (such as those offered by ATOFINA for optical media applications) and transparent polycarbonate-polyester blends, as well as combinations comprising at least one of the foregoing polymers, such as Xylex™ polycarbonate/polyester blend (commercially available from GE Plastics, Pittsfield, Mass.), and the like.

The substrate may also include various additives. Such additives are, for example, fillers and/or reinforcing agents; heat stabilizers; antioxidants; flame retardants; light stabilizers; plasticizers; antistatic agents; mold releasing agents; additional resins; blowing agents; and the like, as well as combinations comprising at least one of the foregoing additives. Examples of fillers or reinforcing agents may include glass fibers, asbestos, carbon fibers, silica, talc, calcium carbonate, and the like. Examples of heat stabilizers may include triphenyl phosphite, tris-(2,6-dimethylphenyl) phosphite, tris-(mixed mono- and di-nonylphenyl)phosphite, dimethylbenene phosphonate, trimethyl phosphate, and the like. Examples of antioxidants may include octadecyl-3-(3,5-di-tert-butyl-4-hydroxyphenyl)propionate, pentaerythrityl-tetrakis[3-(3,5-di-tert-butyl-4-hydroxyphenyl) propionate], and the like. Examples of light stabilizers may include 2-(2-hydroxy-5-methylphenyl)benzotriazole, 2-(2-hydroxy-5-tert-octylphenyl)-benzotriazole, 2-hydroxy-4-n-octoxy benzophenone, and the like. Examples of plasticizers may include dioctyl-4,5-epoxy-hexahydrophthalate, tris-(octoxycarbonylethyl)isocyanurate, tristearin, epoxidized soybean oil, and the like. Examples of the antistatic agent may include glycerol monostearate, sodium stearyl sulfonate, sodium dodecylbenzenesulfonate, and the like. Examples of mold releasing agents may include stearyl stearate, beeswax, montan wax, paraffin wax, and the like. Examples of additional resins may include but are not limited to polypropylene, polystyrene, polymethyl methacrylate, polyphenylene oxide, and the like. Combinations of any of the foregoing additives may be used.

The substrate can, optionally, include an identifier, e.g., a taggant, such as a fluorescent dye, or the like, capable of producing a detectable photoluminescence when excited. Optionally, the polymer may exhibit intrinsic photoluminescence (such that it is not necessary to add a taggant in order to produce a detectable photoluminescence). For example, Fries Product may be detectable, a fluorescent monomer can be copolymerized into the backbone or endcap of the polymer, the fluorescence properties may be intrinsic to the polymer (i.e., "backbone" fluorescence), and/or the like.

Suitable tags are generally fluorescent or luminescent materials that are selected to be chemically compatible with the polymer and have a heat stability consistent with engineering plastics compounding and in particular with the processing conditions of the portion of the media in which they are included (e.g., the polymer substrate). Non-optically variable compounds (e.g., static compounds) comprise luminescent tags such as an organic fluorophore, an inorganic fluorophore, an organometallic fluorophore, a phosphorescent material, a luminescent material, semiconducting luminescent nanoparticle, and the like, as well as combinations comprising at least one of the foregoing tags. In an exemplary embodiment, the luminescent tags are selected from classes of dyes that exhibit high robustness against ambient environmental conditions and temperature stability of greater than or equal to about 350° C., preferably greater than or equal to about 375° C., and more preferably greater than or equal to about 400° C. The tag(s) can be hidden behind the matrix absorption (i.e., the backbone absorption from the media (e.g., in the substrate)) or from any additive or colorant present in the substrate. The tag(s) can have a peak excitation wavelength outside the visible (e.g., in the ultraviolet range) with a peak emission in the visible or in the near infrared region of the spectrum. When the difference between the excitation and the emission peak is greater than about 50 nm, these compounds are usually referred to as long (positive) stokes shift dyes. In an exemplary embodiment, the luminescent tags can be from the classes of long stokes shift dyes that are excited by long ultraviolet wavelengths and emit in the visible. For example, the first tag (e.g., fluorophore) can have long stokes shift properties to ensure detection of the presence of the second tag (e.g., fluorophore) without triggering (or at least minimizing) excitation of the first tag.

Illustrative luminescent tags include fluorescent tags for example, dyes such as polyazaindacenes and/or coumarins (including those set forth in U.S. Pat. No. 5,573,909); lanthanide complexes, hydrocarbon and substituted hydrocarbon dyes; polycyclic aromatic hydrocarbons; scintillation dyes (e.g., oxazoles and oxadiazoles); aryl- and heteroaryl-substituted polyolefins ($C_2$-$C_8$ olefin portion); carbocyanine dyes; phthalocyanine dyes and pigments; oxazine dyes; carbostyryl dyes; porphyrin dyes; acridine dyes; anthraquinone dyes; anthrapyridone dyes; naphtalimide dyes; benzimidazole derivatives; arylmethane dyes; azo dyes; diazonium dyes; nitro dyes; quinone imine dyes; tetrazolium dyes; thiazole dyes; perylene dyes; perinone dyes; bis-benzoxazolylthiophene (BBOT); xanthene and thioxanthene dyes; indigoid and thioindigoid dyes; chromones and flavones derivatives, and the like, as well as combinations comprising at least one of the fluorescent tags disclosed herein. Luminescent tags also include anti-stokes shift dyes that absorb in the near infrared wavelength and emit in the visible wavelength. Desirably, fluorophore(s) having a sufficient heat stability to be detectable after processing and forming of the article are employed, such as the use of the fluorophores disclosed in U.S. Pat. No. 6,514,617, which is commonly assigned herewith, used in polycarbonate or engineering thermoplastics with similar or higher processing temperatures.

The following is a partial list of some fluorescent and/or luminescent dyes: 5-amino-9-diethyliminobenzo(a)phenoxazonium perchlorate7-amino-4-methylcarbostyryl, 7-amino-4-methylcoumarin, 7-Amino-4-trifluoromethylcoumarin, 3-(2'-benzimidazolyl)-7-N,N-diethylaminocoumarin, 3-(2'-benzothiazolyl)-7-diethylaminocoumarin, 2-(4-biphenylyl)-5-(4-t-butylphenyl)-1,3,4-oxadiazole, 2-(4-biphenylyl)-5-phenyl-1,3,4-oxadiazole, 2-(4-biphenyl)-6-phenylbenzoxazole-1,3, 2,5-Bis-(4-biphenylyl)-1,3,4-oxadiazole, 2,5-bis-(4-biphenylyl)-oxazole, 4,4'-bis-(2-butyloctyloxy)-p-quaterphenyl, p-bis(o-methylstyryl)-benzene, 5,9-diaminobenzo(a)phenoxazonium perchlorate, 4-dicyanomethylene-2-methyl-6-(p-dimethylaminostyryl)-4H-pyran, 1,1'-diethyl-2,2'-carbocyanine iodide, 1,1'-diethyl-4,4'-carbocyanine iodide, 3,3'-diethyl-4,4',5,5'-dibenzothiatricarbocyanine iodide, 1,1'-diethyl-4,4'-dicarbocyanine iodide, 1,1'-diethyl-2,2'-dicarbocyanine iodide, 3,3'-diethyl-9,11-neopentylenethiatricarbocyanine iodide, 1,3'-diethyl-4,2'-quinolyloxacarbocyanine iodide, 1,3'-diethyl-4,2'-quinolylthiacarbocyanine iodide, 3-diethylamino-7-diethyliminophenoxazonium perchlorate, 7-diethylamino-4-methylcoumarin, 7-diethylamino-4-trifluoromethylcoumarin, 7-diethylaminocoumarin, 3,3'-diethyloxadicarbocyanine iodide, 3,3'-diethylthiacarbocyanine iodide, 3,3'-diethylthiadicarbocyanine iodide, 3,3'-diethylthiatricarbocyanine iodide, 4,6-dimethyl-7-ethylaminocoumarin, 2,2'-dimethyl-p-quaterphenyl, 2,2-dimethyl-p-terphenyl, 7-dimethylamino-1-methyl-4-methoxy-8-azaquinolone-2, 7-dimethylamino-4-methylquinolone-2, 7-dimethylamino-4-trifluoromethylcoumarin, 2-(4-(4-dimethylaminophenyl)-1,3-butadienyl)-3-ethylbenzothiazolium perchlorate, 2-(6-(p-dimethylaminophenyl)-2,4-neopentylene-1,3,5-hexatrienyl)-3-methylbenzothiazolium perchlorate, 2-(4-(p-dimethylaminophenyl)-1,3-butadienyl)-1,3,3-trimethyl-3H-indolium perchlorate, 3,3'-dimethyloxatricarbocyanine iodide, 2,5-diphenylfuran, 2,5-diphenyloxazole, 4,4'-diphenylstilbene, 1-ethyl-4-(4-(p-dimethylaminophenyl)-1,3-butadienyl)-pyridinium perchlorate, 1-ethyl-2-(4-(p-dimethylaminophenyl)-1,3-butadienyl)-pyridinium perchlorate, 1-ethyl-4-(4-(p-dimethylaminophenyl)-1,3-butadienyl)-quinolium perchlorate, 3-ethylamino-7-ethylimino-2,8-dimethylphenoxazin-5-ium perchlorate, 9-ethylamino-5-ethylamino-10-methyl-5H-benzo(a)phenoxazonium perchlorate, 7-ethylamino-6-methyl-4-trifluoromethylcoumarin, 7-ethylamino-4-trifluoromethylcoumarin, 1,1',3,3,3',3'-Hexamethyl-4,4',5,5'-dibenzo-2,2'-indotricarboccyanine iodide, 1,1',3,3,3',3'-Hexamethylindodicarbocyanine iodide, 1,1',3,3,3',3'-Hexamethylindotricarbocyanine iodide, 2-methyl-5-t-butyl-p-quaterphenyl, N-methyl-4-trifluoromethylpiperidino-<3,2-g>coumarin, 3-(2'-N-methylbenzimidazolyl)-7-N,N-diethylaminocoumarin, 2-(1-naphthyl)-5-phenyloxazole, 2,2'-p-phenylen-bis(5-phenyloxazole), 3,5, 3"", 5""-tetra-t-butyl-p-sexiphenyl, 3,5,3"",5""-tetra-t-butyl-p-quinquephenyl, 2,3,5,6-1H,4H-tetrahydro-9-acetylquinolizino-<9,9a, 1-gh>coumarin, 2,3,5,6-1H,4H-tetrahydro-9-carboethoxyquinolizino-<9,9a, 1-gh>coumarin, 2,3,5,6-1H,4H-tetrahydro-8-methylquinolizino-<9,9a, 1-gh>coumarin, 2,3,5,6-1H,4H-tetrahydro-9-(3-pyridyl)-quinolizino-<9,9a, 1-gh>coumarin, 2,3,5,6-1H, 4H-tetrahydro-8-trifluoromethylquinolizino-<9,9a, 1-gh>coumarin, 2,3,5,6-1H,4H-tetrahydroquinolizino-<9, 9a,1-gh>coumarin, 3,3',2'',3'''-tetramethyl-p-quaterphenyl, 2,5,2'''',5'''-tetramethyl-p-quinquephenyl, p-terphenyl, p-quaterphenyl, nile red, rhodamine 700, oxazine 750, rhodamine 800, IR 125, IR 144, IR 140, IR 132, IR 26, IR5, diphenylhexatriene, diphenylbutadiene, tetraphenylbutadiene, naphthalene, anthracene, 9,10-diphenylanthracene, pyrene, chrysene, rubrene, coronene, phenanthrene; and the like, as well as combinations comprising at least one of the foregoing.

Luminescent tags may include luminescent nanoparticles having a size (measured along a major diameter) of about 1 nanometer (nm) to about 50 nanometers. Exemplary luminescent nanoparticles include rare earth aluminates (such as strontium aluminates doped with europium and dysprosium, and the like); semi-conducting nanoparticles (such as CdSe, CdTe, CdS, ZnS, $Cd_3P_2$, PbSe, and the like, including core-shell particles such as CdSe/ZnS, CdTe/CdS, and the like); and the like, as well as combinations comprising at least one of the foregoing. In one embodiment, fluorescent tags such as perylenes such as anthra[2,1,9-def:6,5,10-d"e"f"]diisoquinoline-1,3,8,10(2H,9H)-tetrone, 2,9-bis[2,6-bis(1-methylethyl)phenyl]-5,6,12,13-tetraphenoxy are utilized as the luminescent tags.

In addition to the static tags, the layer can comprise an optically variable tag, e.g., a compound that has a fluorescence emission that changes in fluorescence intensity and/or wavelength as a function of time. For example, the media may be designed to be evaluated several times, i.e., the authenticating signal is repeatable, while in other embodiments the authenticating signal may be capable of evaluation only once due to the use of optically variable tags that, for example, degrade after one or more authentication sequences. In one exemplary embodiment, the authenticatable polymer can comprise an optically variable tag that can be authenticated multiple times, i.e., for example, at various points during use in an optical device or kiosk. Due to the desired interaction between the substrate and the other layer, choice of the tag(s) depends upon the choice of the layer used in conjunction with the substrate.

Some suitable optically variable tags are generally fluorescent or luminescent materials that are selected to be chemically compatible with the polymer and have a heat stability consistent with engineering plastics compounding and in particular with the processing conditions of the portion of the media in which they are included (e.g., the polymer substrate). Possible optically variable tags include oxadiazole derivatives, luminescent conjugated polymers, and the like. Illustrative examples of suitable luminescent conjugated polymers are blue emitting luminescent polymers, such as poly-paraphenylenevinylene derivatives. Illustrative examples of suitable oxadiazole derivatives include oxadiazole derivatives substituted with a biphenyl or substituted byphenyl in the 2-position and with a phenyl derivative in the 5-position. For example, tert-butyl phenyl oxadiazole, bis(biphenylyl) oxadiazole, as well as mixtures comprising at least one of these tags.

The concentration of the tag(s) depends on the quantum efficiency of the tag, excitation and emission wavelengths, and employed detection techniques, and will generally be present in an amount of about $10^{-18}$ weight percent (wt %) to about 2 wt %, based upon a total weight of the substrate (or layer in which the tag is present), optionally in an amount of about $10^{-8}$ wt % to about 0.5 wt %, and, more specifically, in an amount of about $10^{-5}$ wt % to about 0.05 wt %.

To further enhance authentication, the substrate (and/or another layer) can, optionally, also (or alternatively) contain colorants. These colorants may, for example, impart a specific appearance to the tagged polymer or tagged data storage media under normal lighting conditions (e.g., daylight). To enable facile and accurate authentication of the storage media, it is desirable that any colorants used do not interfere with the photoluminescent emissions. For example, the colorant could exhibit no or only very weak fluorescence under UV excitation compared to the taggant (e.g., fluorescent dye). Suitable colorants may include non-fluorescent derivatives of the following dye families: anthraquinones, methine, perinones, azo, anthrapyridones, quinophtalones, and the like, as well as combinations comprising at least one of the foregoing colorants.

Referring now to FIGS. 1-4 that illustrate various concepts that could be used to create disks that have different readback capability for two lasers. FIG. 1 illustrates using laser-absorbing spot(s) or band(s) (hereinafter referred to as "spot") to block one of the two laser wavelengths. For example, 780 nm-absorbing spot(s) can be deposited onto a DVD. The drive (e.g., read device), that can "switch" from a 650 nm laser to a 780 nm laser, can test the readability (reflectivity signal) at the spot location(s). The spot(s) can be created in a post-processing step, for example using modified polycarbonate (e.g., using a photoreactive dye in polycarbonate). Alternatively, spin coating of a metallized substrate with photosensitive dye(s) and subsequent photomasking could be used to create the spot(s).

Figure 2:
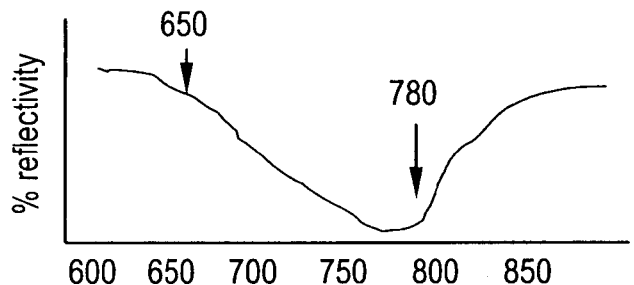
FIG. 2 is a graphical representation of the reflectivity profile of a data portion of an optical disk wherein an optical modifier (a near infrared (NIR) absorber) has been added to selectively block 780 nm and not 650 nm.

FIG. 2 graphically illustrates a special reflectivity profile created using a laser absorbing dye (e.g., NIR (near infrared) absorber). For example, the absorbing dye can be a NIR absorber incorporated into the substrate to provide a specific profile at 650 nm and at 780 nm. The drive would be able to recognize the optical signals (such as reflectivity (e.g., percent reflectivity (% R)) at each wavelength (e.g., % R 780 nm and % R 650 nm) by testing the data portion with both lasers and authenticating the optical signal combinations (e.g., the reflectivity ratio(s)). Such optical signals and ratios can be tailored to be recognized by a specific type of player only and therefore further enhance copy protection. Also, since this type of solution is based on chemistry and on a response (for instance reflectivity differences), which is a non-digital signature by definition, duplication of these disks by hackers will be a very difficult task. Optionally, this method can employ the use of a hybrid disk (disk containing two types of data formats such as CD and DVD tracks), thereby rendering the copying task even more difficult since the disk content could not be copied onto a hard drive, a CD-R or CD-RW, a DVD-R, or any recordable format currently available on the market.

Figure 3:
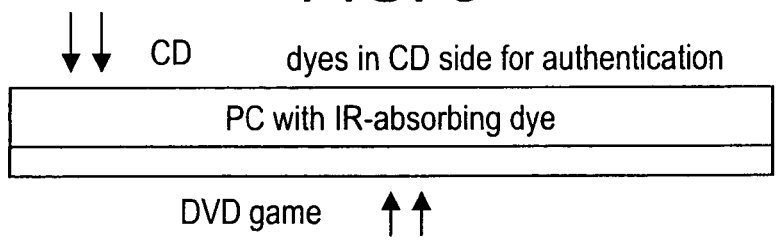
FIG. 3 is a schematic representation of a hybrid optical disk with two read sides, wherein one side is a DVD layer and wherein the other side is a CD layer containing a NIR absorber to enable dual laser authentication.
Figure 4:
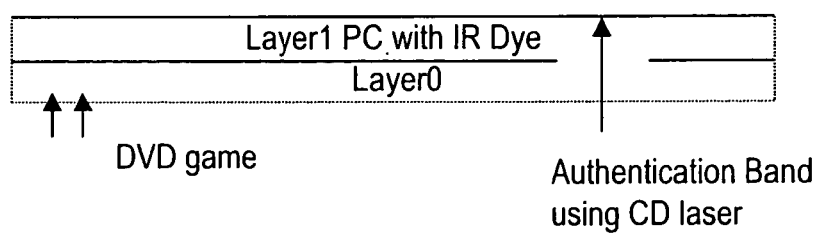
FIG. 4 schematically illustrates a hybrid disk readable from only one side including a DVD layer and a CD layer, wherein the CD layer contains a NIR absorber to enable dual laser authentication.

FIGS. 3 and 4 illustrate some exemplary configurations of hybrid disks. In one exemplary embodiment, the hybrid disks can have both CD and DVD tracks. In FIG. 3, a CD and a DVD substrate can be bonded together to form a CD/DVD hybrid disk. The CD substrate, for example, can contain a NIR absorber for authentication using the reflectivity differences at 650 nm and 780 nm. Upon authentication of the CD side, the optical drive (or the software controlling it) can allow access to the rest of the disk located on the other side of the disk (or vice versa). In such a case, the user may need to manually flip the disk to allow the drive to read the other side. Advanced drives may comprise optical components that allow the laser to read any side of the disk without manual intervention from the end user (no "flipping" required).

FIG. 4 illustrates another type of hybrid disk (sometimes referred to as Super Audio CD (SACD)) where the different data portions can be read from the same side. For example, Layer 1 (L1) can be a CD substrate and may contain a NIR absorber that creates a different reflectivity profile at 650 nm and 780 nm. Layer 0 (L0) can be a DVD substrate to which access will be granted by the software only if the presence of an L1 layer with the particular reflectivity profile is detected (or vice versa). The authentication of the L1 can be triggered after/during booting of the disk and at any time selected after the data access to the L0 layer is granted. It is further desirable to trigger the authentication sequence randomly in order to limit the risk of identifying the computer code related to the authentication sequence. Optionally, different locations of the L1 could be tested in order to further complicate the task of breaking the authentication sequences embedded into the computer code of the software program or game.

Although it is less desirable because of the intricacy of the replication methods, it is conceivable to produce hybrid disks where two or more data formats are located on the same substrate. One example of this hybrid disk would be a disk comprising both CD and DVD tracks where both tracks have been formed on the same substrate. The disk could be, for instance, a 1.2 millimeter (mm) thick, single layer disk with both CD and DVD tracks. Alternatively, the disk could comprise two half disks (e.g., 0.6 mm thick) where the L1 substrate would have both CD and DVD tracks. A NIR absorber can be present in the optical path of the CD tracks thus creating a different reflectivity profile when the CD tracks are read with the 650 nm laser and the 780 nm laser.

Figure 5:
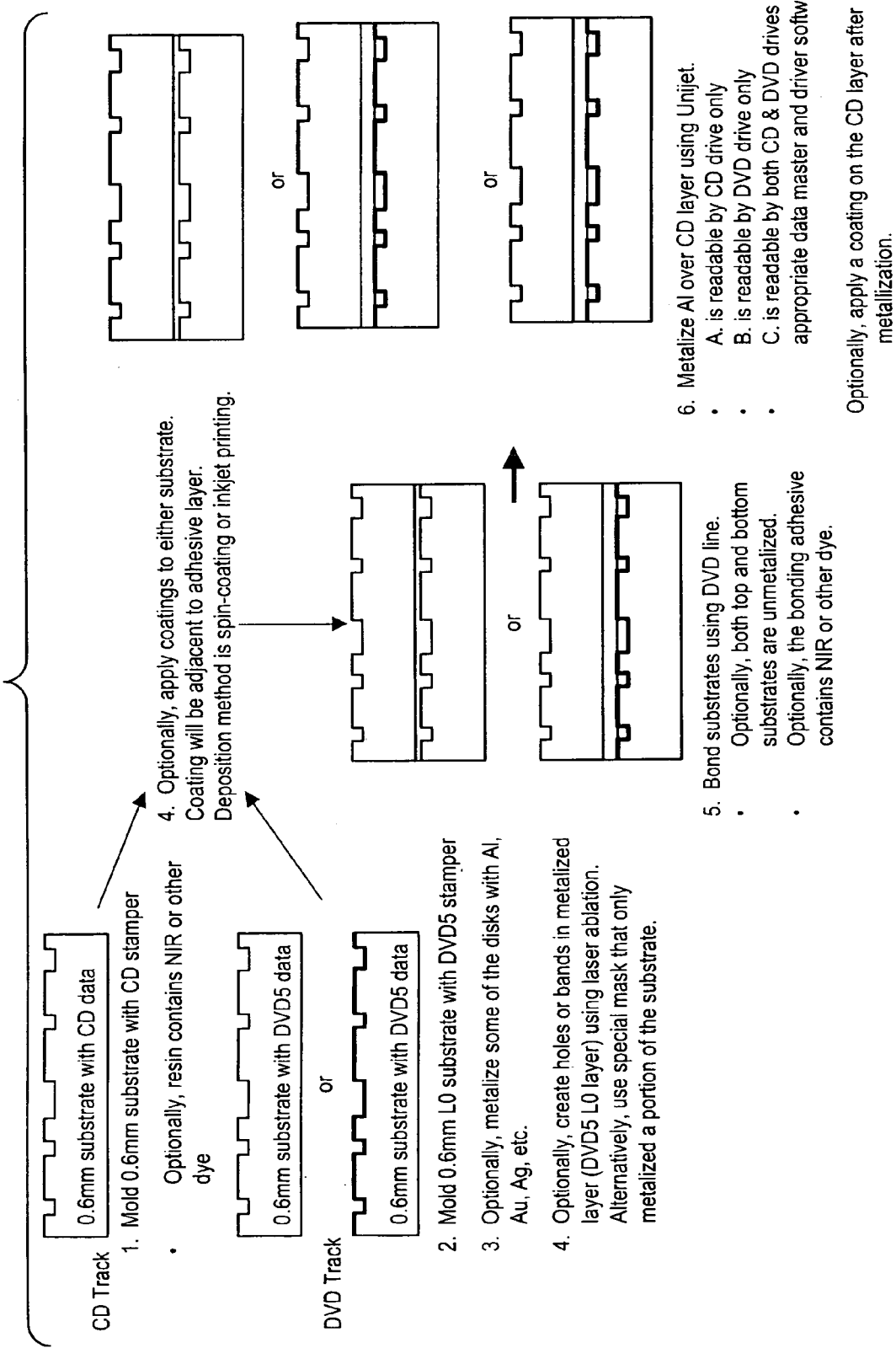
FIG. 5 is a schematic illustration of dual laser authenticatable multi-layer disks and methods to produce them.

FIG. 5 illustrates several methods of making hybrid disks such as those described with respect to FIG. 4. These hybrid disks can comprise both CD and DVD tracks, for example. Similarly, the hybrid disks could be a DVD hybrid for players such as DVD players having a red and a blue laser. The method can include forming one or more substrates (e.g., having a thickness of about 0.3 millimeters (mm) to about 2.0 mm, or, more specifically, about 0.6 mm to about 1.2 mm, or even more specifically, about 0.6 mm), such as by molding with a CD/DVD injection-molding machine fitted with an appropriate stamper (e.g., CD, DVD, and the like). The all or a portion of a side of the substrate(s) can be metallized (e.g., with aluminum, silver, gold, or the like, as well as alloys or combinations comprising at least one of the foregoing metals). Holes or bands can be created in the metallization using ablation, a mask (e.g., during deposition), and/or the like. A coating can then optionally be applied (e.g., via spin coating, inkjet printing, lamination, spraying, or the like, as well as combinations comprising at least one of the foregoing) to the substrate(s), e.g., adjacent to an adhesive layer. The substrates can then be bonded together. The bonded article can then be metallized (e.g., with aluminum, or the like), such as over the CD substrate. Optionally, a coating can be applied over the metallization. It is noted that any of the layer(s), coating(s), and substrate(s) may comprise a dye. The resultant media illustrate above item 6 in FIG. 5, are (from top to bottom), readable by a CD drive only, readable by a DVD drive only, and readable by both CD and DVD drives with appropriate data master and drive software.

In order to authenticate the disk, the disk drive system can comprise controllers (firmware, software, and the like) that can identify an authentic disk. For example, when a disk is disposed in a drive (e.g., inserted into the drive), the drive system can illuminate the disk with a laser of a particular wavelength. If the desired result is received, the drive can change to a different wavelength, e.g., from 650 nm to 405 nm, from 780 nm to 650 nm, from 405 nm to 780 nm, etc. At the different wavelength, an authentic disk would be readable. The desired result can be, for example: (i) the disk is identified as a CD, yet only a particular reflectivity is received by the drive at 780 nm (in a selected area or throughout the disk), such as a reflectivity of less than or equal to 50% (or, more specifically, less than or equal to 40%, or, even more specifically, less than or equal to 25%) while a reflectivity of greater than or equal to 65% is expected from standard CDs; (ii) the disk is identified as a CD, yet immeasurable reflectivity is received by the drive at 780 nm in a predetermined location (or throughout the disk); or the like, or a combination comprising at least one of the foregoing.

In another embodiment, a disk can be disposed in a drive. The drive can, optionally, identify the type of disk (e.g., DVD, CD . . . ). Depending upon the type of disk, the drive can illuminate the disk with an appropriate laser at an appropriate wavelength and disk spin rate. An optical signal (e.g., % R, % T, and/or the like) can be obtained from the disk at the illumination wavelength. The drive can then illuminate the disk at a second wavelength (e.g., due to instructions from the disk (such as in the boot up sector), in the drive firmware, and/or from an external source (such as a CPU or the like)) to obtain a second optical signal. The optical signals can be compared to reference signal(s). The reference signal(s) can be maintained in the firmware, on the disk (e.g., in the boot sector), external to the disk and drive, or the like, as well as a combination comprising at least one of the foregoing. Optionally, the first optical signal and the second optical signal can be compared to one another, e.g., to obtain a ratio, and the ratio can be compared to the reference signal.

For example, an authentic disk is disposed in a disk drive. The boot sector of the disk identifies the disk as a CD. The drive software causes the drive controllers to illuminate a selected portion of the disk with a 780 nm laser. If the portion of the disk does not have a preselected optical property (reflectivity and/or transmission) range (that is different than standard (i.e., standard is greater than or equal to 65% reflectivity)), the disk can be rejected as counterfeit. If the disk has the preselected optical property, the software causes the controllers to illuminate the selected portion with a different wavelength (and/or to illuminate a different portion with a different wavelength). If the selected portion is not readable at the different wavelength (e.g., change from 780 nm to 650 nm), then the disk is identified as counterfeit. If the selected portion is readable at the different wavelength (e.g., change from 780 nm to 650 nm), then the disk can be played. The selected portion can be a set portion or a code in the boot sector can notify the drive of the location of the selected portion, thereby making it more random and more difficult to copy. Optionally, the information regarding the location of the selected portion may be placed outside the boot sector, such as, for example, in the data region. Desirably, the information is located at a position where it can be retrieved shortly after the booting of the disk to ensure that only a minimum of information is accessible before the authentication sequence starts.

In another embodiment, two lasers, laser 1 and 2, are employed to collect optical signals from a disk, e.g., which is operated with laser 1. The laser 2 measures the optical signal related to reflectivity at the laser wavelength where an optical dye in the disk absorbs at this wavelength. If the dye is not present in the disk material, then at the wavelength of laser 2, the collection of optical signal has optical signal with the root mean square (RMS) value RMS1. If the dye is present in the disk material at a predetermined loading, then at the wavelength of laser 2, the collection of optical signal has optical signal with the root mean square value RMS2. For authentication purposes, a measured RMS value is compared to a stored value. At a selected dye concentration in the disk material, RMS1 is larger than RMS2. This can be used for authentication.

The disclosed method can be embodied in the form of computer or controller implemented processes and drive systems for practicing those processes. It can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the method. The program code (which could be new piece of program code, or a patch or upgrade of an existing piece of software or firmware) can also be downloaded from the Internet. In one embodiment, dual laser authentication of the optical disk could be performed online by a web-based application during the software registration process. If the disk is recognized as authentic, the web-based application could authorize the installation of the software on the computer. The disk serial number (which could be either digitally encrypted in the disk or just provided with the product), as well as optional other computer specific parameters (such as processor serial number, operating system serial number, or other computer specific identifier), could be analyzed during the transaction to prevent/limit reinstallation of the software.

Additionally, the activation transaction could be stored in a central database in order to provide additional ways to fight piracy. The method may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the method. When implemented on a general-purpose microprocessor, the computer program code segments configure the microprocessor to create specific logic circuits.

Optionally, the dual laser authentication can be employed with other information carrying substrates. Information carrying substrates include: payment cards (credit/debit/store cards), ID cards, license (e.g., driver's license), permits, passports, personal information card (e.g., electronically readable card containing patient medical history), security documents that may contain digital information, and so forth, and optionally in a coded and/or encrypted form.

The following examples are meant to be exemplary, not limiting.

EXAMPLE 1

A variety of colored compact disks with different transmission values at the two laser wavelengths (650 mm and 780 nm) were produced and tested on a bank of players.

Yellow, Light Green, Dark Blue, and Black optical quality (O) polycarbonate (PC) pellets were produced as per the formulations outlined in Table 1. OQ polycarbonate resin powder was mixed with additives (heat stabilizer and mold release) and dyes using a mechanical tumbler until a homogenous mixture was obtained (typically 30 to 40 minutes for a 30 kilogram (kg) batch). The mixture was then extruded on a Werner and Pfleiderer ZSK-30 model twin-screw extruder. The extrusion conditions employed were typically as follows: Zone 1=480° F. (about 249° C.); Zone 2=500° F. (about 260° C.); Zone 3=520° F. (about 271° C.); Zone 4=540° F. (about 282° C.); Zone 5=550° F. (about 288° C.); Die head=550° F. (about 288° C.); and Screw speed=400 to 450 revolutions per minute (rpm). The polymer strands coming out of the die head were cooled using a water bath and pelletized. The resin was then molded into CD-ROMs on a Netstal molding machine equipped with Axxicon molds. Light transmission of 1.2 mm thick colored plaques was measured on a Cary 300 BIO Ultra-Violet—Visible (UV-Vis) spectrophotometer.

TABLE 1

Formulation Details

| | Sample (parts by weight) | | | |
|---|---|---|---|---|
| | Yellow | Light Green | Dark Blue | Black |
| Polycarbonate resin (Mw[1] = 17,700) | 100 | 100 | 100 | 100 |
| Mold release agent | 0.03 | 0.03 | 0.03 | 0.03 |
| Heat stabilizer | 0.02 | 0.02 | 0.02 | 0.02 |
| Solvent Yellow 98 | 0.085 | 0.1 | | |
| Solvent Orange 63 | 0.00045 | | | |
| Solvent Green 3 | | 0.01 | | 0.043 |
| Solvent Red 135 | | | | 0.057 |
| Sandoplast Blue 2B | | | 0.04 | |
| Solvent Violet 13 | | | 0.002 | |
| Transmission at 1.2 mm | | | | |
| % $T_{650\,nm}$[2] | 89 | 33 | 16 | 2 |
| % $T_{780\,nm}$[3] | 91 | 90 | 90 | 89 |

[1]Mw = weight average molecular weight in atomic mass units (amu)
[2]% $T_{650\,nm}$ = percent transmission at 650 nm
[3]% $T_{780\,nm}$ = percent transmission at 780 nm CD-ROMs were tested for playability in a matrix comprising approximately 100 drives and players. The Yellow disks had a 100% success rate, whereas the Light Green, Dark Blue, and Black disks were playable on 85% of the players only.

TABLE 2

| CD-ROM Color | % $T_{650}$ | % $T_{780}$ | PlayStation 2 (650 & 780 nm) | Sharp DV-750U (650 nm only) | Microsoft Xbox (650 nm only) |
|---|---|---|---|---|---|
| Yellow | 89 | 91 | Pass | Pass | Pass |
| Light Green | 33 | 90 | Pass | Pass | Fail |
| Dark Blue | 16 | 90 | Pass | Fail | Fail |
| Black | 2 | 89 | Pass | Fail | Fail |

Figure 6:
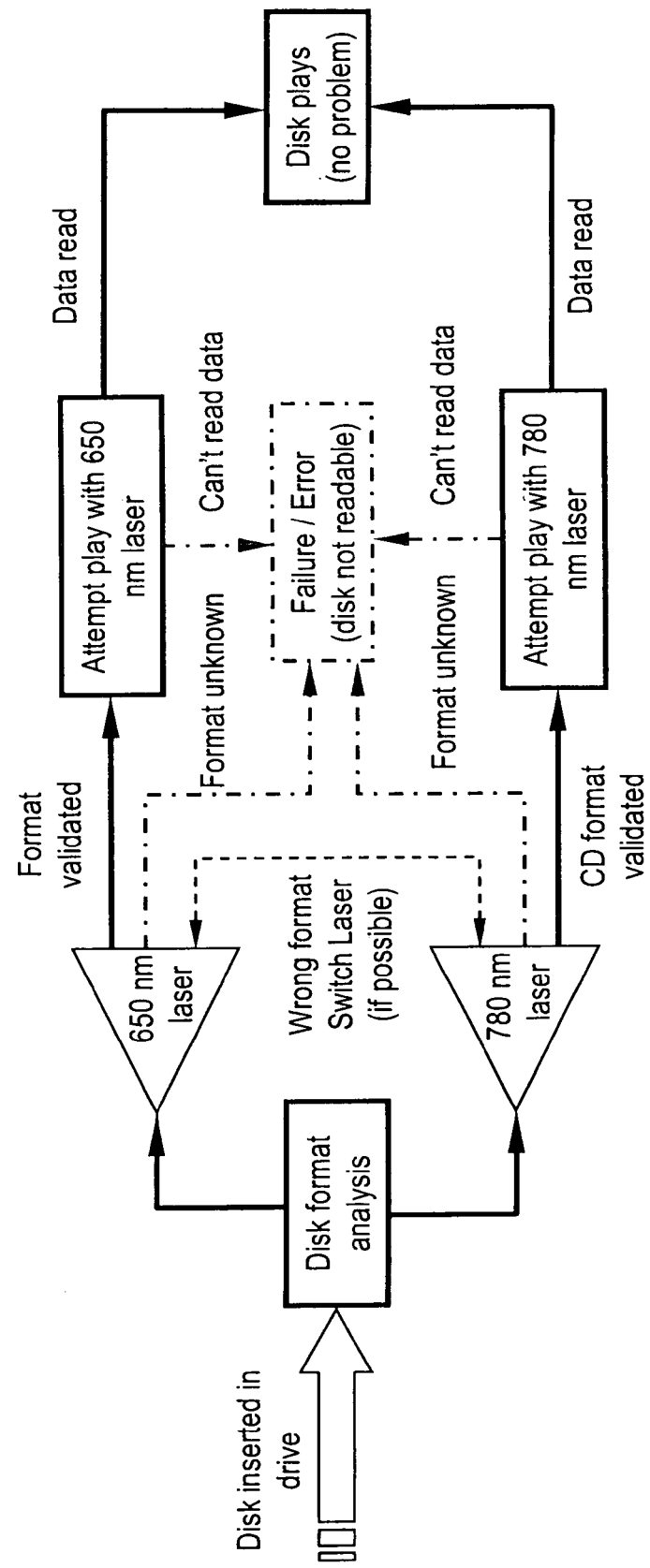
FIG. 6 is a high-level diagram representing the behavior (logic) of a dual-laser optical drive when a disk is inserted.

The data in Table 2 indicates that the type of laser(s) governs the drive response to colored disks designed to have varying reflectivity at 650 nm and 780 nm. PlayStation 2, which has a dual laser system, utilizes the 780 nm laser primarily for authentication/read-back and hence played all the disks. In contrast however, the Sharp and Microsoft Xbox drives, which have a single red laser, differ in their ability to play the 4 disks. It is evident that a certain minimum level of transmission is required at 650 nm for playability. The absolute value is dependent on the player in question, with the Microsoft Xbox console failing to play the Light Green disk, which however, is still playable on the Sharp player. It should be noted that in single laser players, the 650 nm laser is backwards compatible and capable of reading CD-ROM data. A theoretical process map depicting interaction logic between the two lasers for authentication and playback of disks is shown in FIG. 6.

EXAMPLE 2

Figure 7:
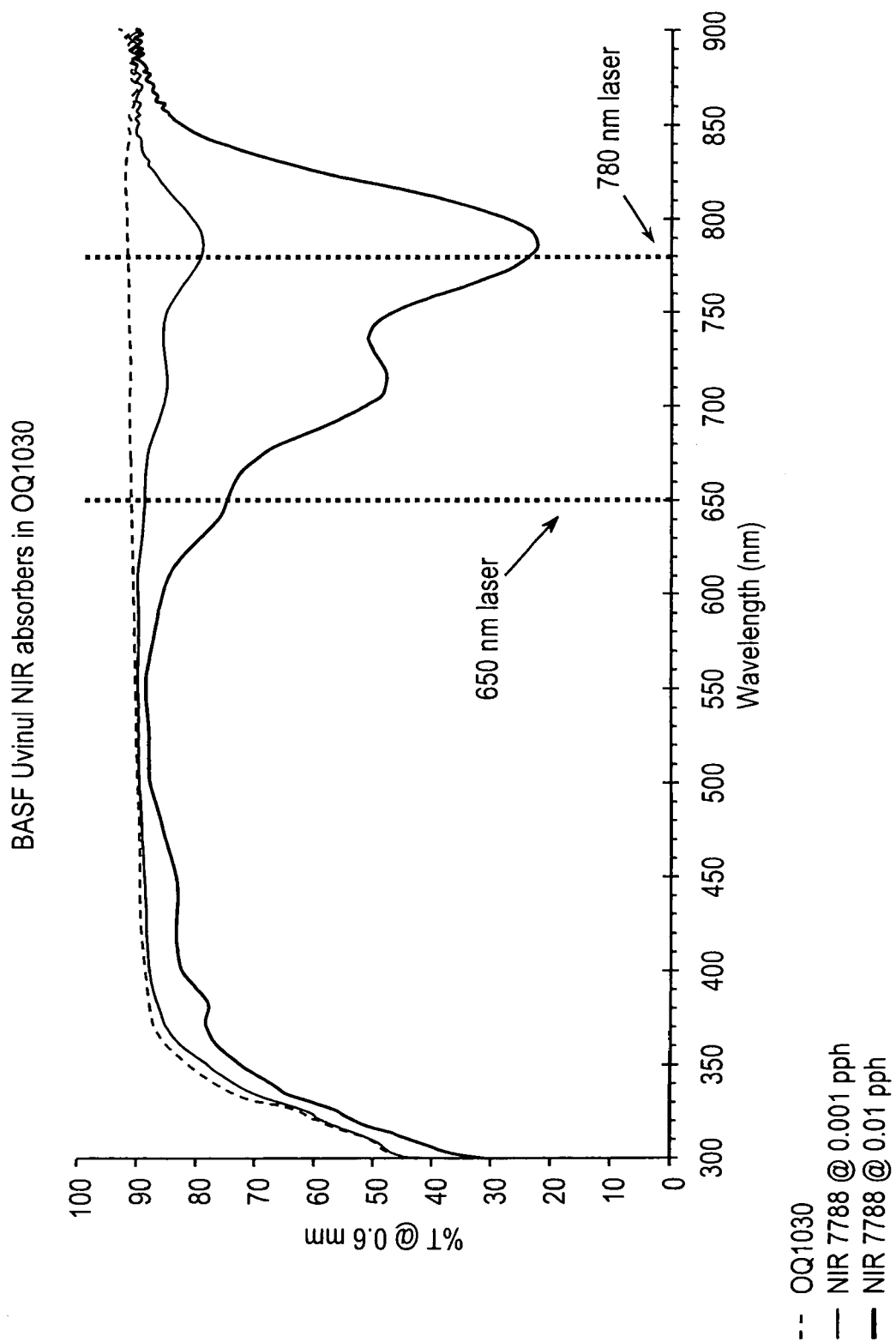
FIG. 7 is a graphical representation of light transmission as a function of wavelength for a clear disk (OQ1030) and for two levels of a NIR absorber that selectively absorbs 780 nm vs 650 nm.

The use of near-infrared absorbers to create special reflectivity profiles that serve as signatures for authentication of optical disks is illustrated below. FIG. 7 shows typical transmission profiles of 0.6 mm thick parts containing two different levels of Lumogen IR788 (sometimes referred to as Uvinul 7788), a quaterylene near infrared absorber manufactured by BASF, Germany. It is clear that as the loading increases, transmission (% T) at 780 nm drops faster compared to that at 650 nm. Thus it is theoretically possible to create disks that are optically transparent at 650 nm and optically opaque at 780 nm by adjusting NIR loadings. It is also possible to create unique ratios of % $T_{(780/650)}$ or vice versa. Screening experiments were conducted to determine the relationship between dye loading, % $T_{780}$ and % $T_{650}$.

TABLE 3

| Composition | Sample (parts by weight) | |
| --- | --- | --- |
| | A | B |
| Polycarbonate resin (Mw = 17,700) | 100 | 100 |
| Mold release agent | 0.03 | 0.03 |
| Heat stabilizer | 0.02 | 0.02 |
| BASF Lumogen IR 788 | 0.0017 | 0.0066 |

OQ polycarbonate resin powder was mixed with the additives (heat stabilizer and mold release) and NIR dye using a mechanical tumbler until a homogenous mixture was obtained (typically 30 to 40 minutes for a 30 kg batch). The mixture was then extruded on a Werner and Pfleiderer ZSK-30 model twin-screw extruder. The extrusion conditions employed were typically as follows: Zone 1=480° F. (about 249° C.); Zone 2=500° F. (about 260° C.); Zone 3=520° F. (about 271° C.); Zone 4=540° F. (about 282° C.); Zone 5=550° F. (about 288° C.); Die head=550° F. (about 288° C.); and Screw speed=400 to 450 revolutions per minute (rpm). The polymer strands coming out of the die head were cooled using a water bath and pelletized.

CD and DVD9 substrates were molded from the pelletized material after drying in an oven for 4 hours at 120° C. Sumitomo SD30 Molding Machines with Seiko Geikin DVD Molds were used for the molding operation. The substrates (DVD halves) were metallized using a Unaxis Metallizers sputtering system. The bonding operation was performed on a Steag Hamatech Uniline 3000 DVD Bonder. Complete electrical testing was completed on CD CATS and AudioDev DVDPro SA300 Pulsetech Drives. Additional physical and mechanical parameters were tested on Dr. Schenk PROmeteus MT136.

Table 4 lists the bootup responses of optical disks made from Formulations A and B on two common drives—PlayStation 2 and Microsoft Xbox. Transmission values measured at laser wavelengths of 650 nm and 780 nm on a Cary 300 BIO UV-Vis spectrophotometer were used for calculating the ratio % $T_{(780/650)}$.

TABLE 4

| | Formulation A | Formulation B | Formulation A | Formulation B |
| --- | --- | --- | --- | --- |
| Format | DVD | DVD | CD | CD |
| PlayStation 2 | Pass | Fail | Pass | Fail |
| Microsoft Xbox | Pass | Pass | Pass | Pass |
| Ratio % $T_{(780/650)}$ | 0.89 | 0.47 | 0.68 | 0.22 |
| % T @ 650 nm | 88 | 80 | 83 | 69 |
| % T @ 780 nm | 73 | 38 | 57 | 15 |

The PlayStation 2 console is known to have a dual laser system and typically uses a 780 nm laser to read CD-ROMs as shown in Example 1 above. CDs made from Formulation A boot up without any issues on the PlayStation II console indicating one of two possibilities: (a) successful authentication by 650 nm laser and switch to 780 nm laser for data readback, or (b) successful authentication and data readback by 780 nm laser. CDs made from Formulation B, however, failed to boot up since they have a different % $T_{(780/650)}$ ratio, indicating: (a) the 780 nm laser could not authenticate the disks, (b) the 650 nm laser could not authenticate the disks, or (c) the 650 nm laser authenticated and the system switched to the 780 nm laser that was unable to read data. Thus these disks will be deemed unauthentic when attempted to play them in a PlayStation II console. The 650 nm laser takes precedence while authenticating and reading DVDs and successfully plays Formulation A. (It is conceivable that % $T_{650}$ of Formulation B is below the minimum level necessary for authentication, leading to failure.) An optical signal ratio (e.g., % $T_{(780/650)}$ ratio) can be adjusted so as to identify a particular manufacturer, lot, supplier, and/or the like. For example, the optical signal ratio can be such that the numerator and the denominator of the ratio have a sufficient difference in optical signal to be detectable by the drive (e.g., in transmission, reflectivity, or the like). For example, the ratio of the first optical signal to the second optical signal can be greater than or equal to about 1.15 or less than or equal to about 0.85, or, more specifically, greater than or equal to about 1.20 or less than or equal to about 0.80, or, even more specifically, greater than or equal to about 1.30 or less than or equal to about 0.70.

Also, for example, the difference between the numerator and the denominator of the ratio can be greater than or equal to 15%, or more specifically, greater than or equal to about 20%, or, even more specifically, greater than or equal to 30%. In one embodiment, the first optical signal could be a reflectivity of 50%, while the second optical signal can be a reflectivity of less than or equal to about 42.5% or greater then or equal to about 57.5%.

Interestingly, in case of systems with a single 650 nm laser only, like the Microsoft Xbox console equipped with a Thomson DVD drive, where the DVD laser reads data from CDs as well, authentication and readback is essentially independent of transmission at 780 nm. Hence, if % $T_{650}$ is greater than a minimum predetermined level, disks will be playable, as is confirmed in the experiment above. In such cases, data read-back is limited only by optical reflectivity and hence options for tailoring solutions for different players are limited.

One should note that although specific examples only have been used to illustrate methods of authentication, a clearly defined (or, more particularly a defined, narrow) range of % $T_{(780/650)}$ values which could be considered "authentic", can be integrated into authentication software instructions controlling the bootup and authentication response to ensure accurate authentication. As mentioned before, this serves to increase security and complexity level and decrease transparency to parties interested in duplicating disks.

The previous examples clearly illustrate that optical media players have different responses to the same optical disks. They have also shown that it is possible to create optical disks with a data portion readable by one laser but not the other. Possible methods of making disks with two types of data portions have been presented. Those skilled in the art would understand that by using the described methods, optionally in combination with controlling the readability of a data portion, it is possible to create disks with anti-piracy feature(s) (i.e., copy-resistant disks) or authenticatable disks, in dual laser drives. Although the examples have described systems revolving around CD and DVD formats, this technology can be applied to other wavelengths such those requiring blue lasers (e.g., HD-DVD and Blu Ray).

EXAMPLE 3

The following example illustrates the detection of light-interacting regions formed within the read side of an optical disk with two lasers of an optical drive for disk authentication applications.

Figure 8:
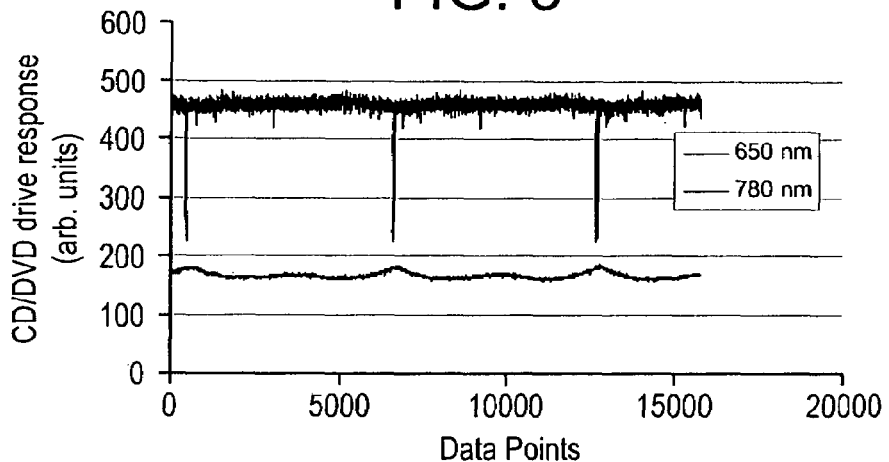
FIG. 8 is a graphical illustration of a response of an optical detector of a CD/DVD combo drive to a light absorbing region formed on the read surface of a DVD disk when drive operates with either a 650-nm laser or 780-nm laser.

A light-absorbing region was produced on a DVD article by an application of a carbon-black-based ink over the read surface of the DVD. The width of the region was about 2 millimeters (mm). A CD/DVD combo optical drive (Plextor America, Fremont, Calif.) was used for the readout of the DVD disk with the light-absorbing region. The drive was commanded from a computer program to initialize the DVD reading using a 650 nm laser (a typical means of reading data from DVD media). A typical collected waveform from the photodetector of the drive is presented in FIG. 8. The data were collected by capturing an analog signal as a function of time from an optical detector of a drive, processing the signal with a digitizing oscilloscope, and displaying the captured temporal waveform on a computer.

Next, the drive was commanded from a computer program to initialize the 780 nm laser in the drive. Such laser is also available in most combo drives to read CDs. A typical collected waveform from the photodetector of the drive from the DVD disk using the 780 nm laser is also presented in FIG. 8. The data were collected by capturing an analog signal as a function of time from the optical detector of the drive, processing the signal with a digitizing oscilloscope, and displaying the captured temporal waveform on the computer.

Figure 9:
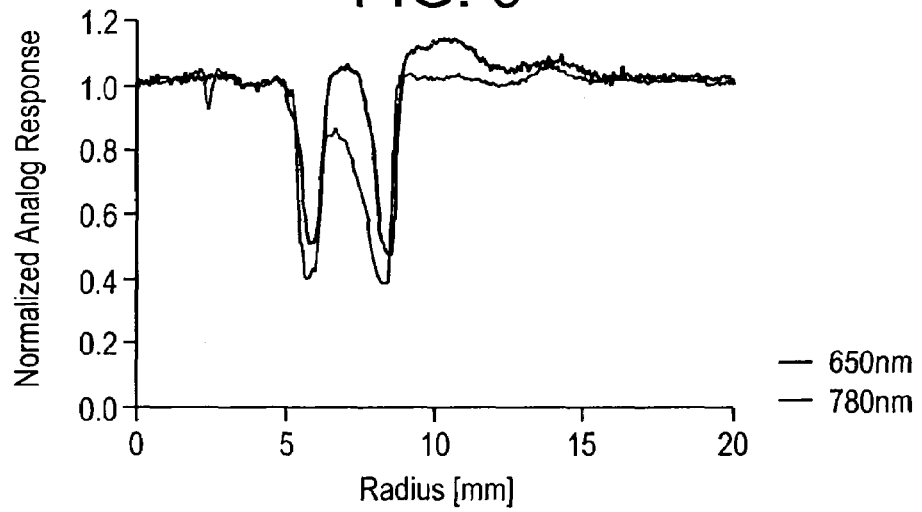
FIG. 9 is a graphical illustration of the detection of a light absorbing region formed on the read surface of a SACD disk with either a 650 nm or 780 nm laser.

A light-absorbing region was produced on a SACD article by an application of a 780 nm absorbing ink comprising of 0.05 wt % SDA6995 (H. W. Sands) in a 5 wt % Nafion solution (commercially available from Aldrich) over the read surface of the disk. The width of the region was about 2 mm. The SACD disk was used because it contains both CD and DVD information on two separate layers, each of which being individually readable by the 780 nm and 650 nm drive lasers, respectively. A CD/DVD combo optical drive (Plextor America, Fremont, Calif.) was used for the readout of the DVD disk with the light-absorbing region. The drive was commanded from a computer program to initialize the SACD using a 650 nm laser. A typical collected waveform from the photodetector of the drive is presented in FIG. 9. As the laser passed over the edges of the region, the waveform intensity decreased to about 50% of the baseline value presumably due to scattering off of the edge of the coating. However, near the center of the region, the waveform intensity is nearly identical to the baseline value, thereby indicating that there is no appreciable absorbance of the 650 nm laser light due to the presence of the region. The data were collected by capturing an analog signal as a function of time from the optical detector of the drive, processing the signal with a digitizing oscilloscope, and displaying the captured temporal waveform on the computer.

Figure 10:
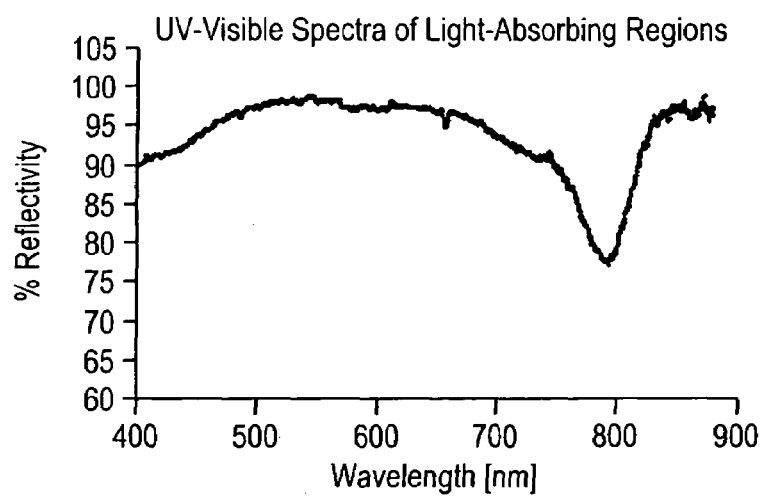
FIG. 10 is a graphical illustration of a UV-Visible spectra of a light-absorbing region.

Next, the drive was commanded from a computer program to initialize the 780 nm laser in the drive. A typical collected waveform from the photodetector of the drive from the SACD disk using the 780 nm laser is presented in FIG. 9. As the laser passed over the edges of the region, the waveform intensity decreased to about 40% of the baseline value, presumably due to scattering off of the edge of the coating. However, near the center of the region, the waveform intensity was 80% of the baseline value (indicating that there was significant absorbance of the 780 nm laser light due to the presence of the region). The data were collected by capturing an analog signal as a function of time from the optical detector of the drive, processing the signal with a digitizing oscilloscope, and displaying the captured temporal waveform on the computer. The apparent differences in waveform intensity as lasers of different wavelength (e.g., 650 nm versus (vs) 780 nm) read data near the center of the region can be used to authenticate disks containing light-absorbing regions. The UV-vis spectra of the light-absorbing region is shown in FIG. 10.

Dual laser optical drives can have an internal logic or firmware tailored to recognize authentic disks that have been designed for dual laser authentication. Such drives could be used, for instance, in game consoles (e.g., Sony PlayStation, Nintendo Game Cube, Microsoft X-box, and the like) as an inexpensive means to fight piracy in the DVD game market. Another example of use of this technology would be its implementation with new DVD players that are becoming capable of executing programs/pieces of program code located on the same DVD as a movie. Such authentication program code could be embedded in the movie files and/or encrypted in order to avoid the risk of seeing hackers easily remove the code and obtain a fully playable copy. If adopted by the industry, dual laser authentication could be a simple yet powerful way of fighting piracy, in particular, piracy of games.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for using an optical article, comprising:
    illuminating a first portion of the optical article with a first laser to obtain a first optical signal, wherein the first laser has a first wavelength;
    illuminating a second portion with a second laser to obtain a second optical signal, wherein the second laser has a second wavelength that is different from the first wavelength; and
    determining if the optical article is authentic by comparing the first optical signal and the second optical signal;
    wherein the first optical signal is selected from the group consisting of reflectivity, transmission, luminescence, polarization, phase, and combinations comprising at least one of these optical signals, and wherein comparing the first optical signal to the second optical signal further comprises determining a ratio of the first optical signal to the second optical signal, and wherein if the ratio is greater than or equal to about 1.15 or less than or equal to about 0.85, the optical article is authentic.

2. The method of claim 1, wherein the ratio is greater than or equal to about 1.20 or less than or equal to about 0.80.

3. The method of claim 2, wherein the ratio is greater than or equal to about 1.30 or less than or equal to about 0.70.

4. A method for using an optical article, comprising:
illuminating a first portion of the optical article with a first laser to obtain a first optical signal, wherein the first laser has a first wavelength;
illuminating a second portion with a second laser to obtain a second optical signal, wherein the second laser has a second wavelength that is different from the first wavelength; and
determining if the optical article is authentic by comparing the first optical signal and the second optical signal to each other to obtain a ratio, and comparing the ratio to a reference.

5. A method for using an optical article, comprising:
illuminating a first portion of the optical article with a first laser to obtain a first optical signal, wherein the first laser has a first wavelength;
illuminating a second portion with a second laser to obtain a second optical signal, wherein the second laser has a second wavelength that is different from the first wavelength; and
determining if the optical article is authentic by comparing the first optical signal and the second optical signal;
wherein a difference between the first optical signal and the second optical signal is greater than or equal to 15%.

6. The method of claim 5, wherein a difference between the first optical signal and the second optical signal is greater than or equal to 20%.

7. The method of claim 6, wherein a difference between the first optical signal and the second optical signal is greater than or equal to 25%.

8. A method for using an optical article, comprising:
illuminating a first portion of the optical article with a first laser to obtain a first optical signal, wherein the first laser has a first wavelength;
illuminating a second portion with a second laser to obtain a second optical signal, wherein the second laser has a second wavelength that is different from the first wavelength;
determining if the optical article is authentic by comparing the first optical signal and the second optical signal; and
identifying the optical article type, wherein if the optical article type is CD, the first wavelength is about 755 nm to about 805 nm, if the optical article type is DVD, the first wavelength is about 625 nm to about 675 nm, and if the optical article type is Blu-Ray or HD-DVD, the first wavelength is about 380 nm to about 430 nm.

9. The method of claim 5, wherein, if the optical article is authentic, further comprising retrieving data from an authentic optical article by illuminating the optical article with the first laser at the first wavelength.

10. The method of claim 5, wherein the optical article has at least two formatted data types.

11. The method of claim 10, wherein the at least two formatted data types comprises DVD formatted data and a type selected from the group consisting of CD formatted data, HD-DVD formatted data, and Blu-ray formatted data.

12. The method of claim 5, further comprising identifying the optical article type prior to obtaining the first optical signal.

13. The method of claim 5, further comprising determining a location of the first portion of the optical article by reading a boot-section of the optical article.

14. The method of claim 5, further comprising identifying the optical article format before authenticating the optical article.

15. The method of claim 5, wherein the first portion is the same location on the optical article as the second portion.

16. The method of claim 5, wherein the first portion is a DVD layer of the optical article and the second portion is another layer of the optical article selected from the group consisting of CD layer, HD-DVD layer, and Blu-ray layer.

17. The method of claim 5, wherein the first portion is on a first side of the optical article and the second portion is on different side of the optical article than the first portion.

18. The method of claim 5, wherein determining if the optical article is authentic further comprises comparing the first optical signal and the second optical signal to a reference representative of an optical article comprising an optical modifier.

19. A optical article drive system encoded with a machine readable computer program code, said code including instructions for causing a computer to implement a method for using an optical article, comprising:
illuminating the optical article with a first laser to obtain a first optical signal, wherein the first laser has a first wavelength;
illuminating the optical article with a second laser to obtain a second optical signal, wherein the second laser has a second wavelength that is different from the first wavelength; and
determining if the optical article is authentic by comparing the first optical signal and the second optical signal;
wherein a difference between the first optical signal and the second optical signal is greater than or equal to 15%.

20. A computer data signal, said computer data signal, comprising:
instructions for causing a computer to implement a method for using a optical article, comprising:
illuminating the optical article with a first laser to obtain a first optical signal, wherein the first laser has a first wavelength;
illuminating the optical article with a second laser to obtain a second optical signal, wherein the second laser has a second wavelength that is different from the first wavelength; and
determining if the optical article is authentic by comparing the first optical signal and the second optical signal;
wherein a difference between the first optical signal and the second optical signal is greater than or equal to 15%.

21. An optical article, comprising:
first data readable at a first wavelength;
second data readable at a second wavelength, wherein the first wavelength and the second wavelength are different; and
an optical modifier disposed in an optical modifier portion of the optical article in optical communication with the first data, wherein the optical modifier changes an optical property of the optical article by a sufficient amount such that a difference between a first optical signal from the first portion and a second optical signal from a second portion of the first data is greater than or equal to 15%;
wherein the first data comprises DVD formatted data and the second data is selected from the group consisting of CD formatted data, HD-DVD formatted data, and Blu-ray formatted data.

22. The optical article of claim 21, further comprising an optical modifier selected from the group consisting of a laser absorber, a luminescence material, a refractive index changer, a scattering agent, a polarization modifier, a non-linear optical material and combinations comprising at least one of the foregoing optical modifier.

23. The optical article of claim 21, wherein a difference between the first wavelength and the second wavelength is greater than or equal to about 50 nm.

24. The optical article of claim 21, wherein the first data is on a first side of the optical article and the second data is on different side of the optical article than the first data.

25. The optical article of claim 21, wherein the first portion and the second portion are the same three dimensional location.

26. An optical article, comprising:
first data readable at a first wavelength;
second data readable at a second wavelength, wherein the first wavelength and the second wavelength are different; and
an optical modifier disposed in an optical modifier portion of the optical article in optical communication with the first data, wherein the optical modifier changes an optical property of the optical article by a sufficient amount such that a difference between a first optical signal from the first portion and a second optical signal from the second portion of the first data is greater than or equal to 15%;
wherein the optical article is selected from the group consisting of an ID card, passport, payment card, license, permit, personal information card, and security document.

27. The optical article of claim 26, wherein a difference between the first wavelength and the second wavelength is greater than or equal to about 50 nm.

28. A method for using an optical article, comprising:
illuminating a first portion of the optical article with a first laser to obtain a first optical signal, wherein the first laser has a first wavelength;
illuminating the first portion with a second laser to obtain a second optical signal, wherein the second laser has a second wavelength that is different from the first wavelength; and
determining if the optical article is authentic by comparing a first optical signal and a second optical signal to a reference representative of an optical article comprising an optical modifier;
wherein a difference between the first optical signal and the second optical signal is greater than or equal to 25%.

29. An optical article, comprising:
first data readable at a first wavelength;
second data readable at a second wavelength, wherein the first wavelength and the second wavelength are different and wherein the first wavelength is higher than the second wavelength; and
an optical modifier disposed in an optical modifier portion of the optical article in optical communication with the first data, wherein the optical modifier changes an optical property of the optical article by a sufficient amount such that a first optical signal from a first portion is greater than or equal to 15% lower than a second optical signal from a second portion.

30. The optical article of claim 29, wherein the first wavelength is 780 nm.

* * * * *